US007329438B2

(12) United States Patent
Frazzitta et al.

(10) Patent No.: US 7,329,438 B2
(45) **Date of Patent: *Feb. 12, 2008**

(54) METHOD OF PRODUCING A HIGH GLOSS COATING ON A PRINTED SURFACE

(75) Inventors: Joseph Frazzitta, 279 Cherry La., East Meadow, NY (US) 11554; Frank V. Frazzitta, Dix Hills, NY (US)

(73) Assignee: Joseph Frazzitta, East Meadow, NY (US)

(*) Notice: Subject to any disclaimer, the term of this patent is extended or adjusted under 35 U.S.C. 154(b) by 251 days.

This patent is subject to a terminal disclaimer.

(21) Appl. No.: 11/013,181

(22) Filed: Dec. 15, 2004

(65) Prior Publication Data

US 2005/0123685 A1 Jun. 9, 2005

(51) Int. Cl.

| | |
|---|---|
| ***C08J 7/16*** | (2006.01) |
| ***C08J 7/18*** | (2006.01) |
| ***B05D 3/02*** | (2006.01) |
| ***B05D 3/06*** | (2006.01) |
| ***B05D 3/12*** | (2006.01) |

(52) U.S. Cl. ...................... 427/494; 427/493; 427/498; 427/512; 427/500; 427/514; 427/388.4; 427/393.5; 427/521; 427/391; 427/395

(58) Field of Classification Search ..................... None
See application file for complete search history.

(56) References Cited

U.S. PATENT DOCUMENTS 3,224,897 A 12/1965 Smith
3,575,109 A 4/1971 Wall
3,791,856 A * 2/1974 Duling et al. ............... 427/359
4,025,685 A 5/1977 Haren et al.
4,322,450 A 3/1982 Gray, III et al. ............ 427/505

(Continued)

OTHER PUBLICATIONS

2001 Corrugated Services LP (Forney, TX), "Major Coating Groups", 2 pages printed from http://www.csipaper.com/csi_coated_mvtr.html on Jul. 11, 2003.

(Continued)

*Primary Examiner*—Marianne Padgett
(74) *Attorney, Agent, or Firm*—Henry D. Coleman; R. Neil Sudol; William J. Sapone

(57) ABSTRACT

The present invention is directed to a method for producing a high gloss coating on a printed surface. In the present method, an aqueous coating composition is deposited onto a surface to be printed using a blanket roller coating face which is a low energy, non-stick, smooth surface profile. In the present method, simultaneous with the deposition of aqueous coating onto a substrate, or shortly thereafter, pressure either alone or in combination with heat may be applied to the coating in order to create a substantially tack-free surface conforming to the surface of the coating face. By using a highly polished coating face, high gloss coatings may be readily obtained using this methodology in a number of traditional printing techniques including wet trap inline sheet-fed printing, heat-set offset printing, dry trap inline flexographic printing, offset web-fed printing and gravure printing. Coatings which are produced utilizing the present invention have high gloss values heretofore unobtainable using aqueous coating compositions.

47 Claims, 3 Drawing Sheets

U.S. PATENT DOCUMENTS

| | | | | |
|---|---|---|---|---|
| 4,327,121 | A | 4/1982 | Gray, III | 427/505 |
| 4,350,735 | A | 9/1982 | Saitoh | |
| 4,452,143 | A | 6/1984 | Heinemann et al. | |
| 4,471,011 | A | 9/1984 | Sporing | |
| 4,490,409 | A | 12/1984 | Nablo | 427/505 |
| 4,491,616 | A | 1/1985 | Schmidle et al. | |
| 4,770,928 | A | 9/1988 | Gaworowski et al. | |
| 5,001,208 | A | 3/1991 | Ross et al. | |
| 5,006,400 | A | 4/1991 | Pinkston et al. | |
| 5,013,811 | A | 5/1991 | Ross | |
| 5,037,668 | A | 8/1991 | Nagy | 427/516 |
| 5,272,971 | A | 12/1993 | Fredericks | |
| 5,376,445 | A | 12/1994 | Fortuin et al. | |
| 5,384,160 | A | 1/1995 | Frazzitta | |
| 5,391,405 | A | 2/1995 | Irifune | 427/516 |
| 6,113,981 | A * | 9/2000 | Ogilvie et al. | 427/223 |
| 6,472,028 | B1 | 10/2002 | Frazzitta et al. | |

OTHER PUBLICATIONS

"John Newton's PET"; *Lamination News*, Winter 1997, pp. 21-25, no month.

General Magnaplate Corp.—Various product brochures (2), no date.

Norton Performance Plastics—Various product brochures (2), no date.

Reeves "Vulcan Reflection"—product brochure , no date.

* cited by examiner

METHOD OF PRODUCING A HIGH GLOSS COATING ON A PRINTED SURFACE

This application claims priority under 35 U.S.C. §120 from application Ser. No.10/331,015, filed Dec. 27, 2002, now U.S. Pat. No. 6,878,413, which in turn claimed priority under 35 U.S.C. §120 from application Ser. No. 10/271,223, filed Oct. 15, 2002, abandoned, which is a divisional application of Ser. No. 09/373,105, now U.S. Pat. No. 6,472,028, issued Oct. 29, 2002.

FIELD OF THE INVENTION

The present invention relates to a novel method for the deposition of an aqueous coating composition in a traditional printing process including, for example, traditional printing techniques such as wet trap inline sheet-fed printing, web-fed offset printing, dry trap printing processes including dry trap inline flexographic printing, offset web-fed printing, and gravure printing. Methods according to the present invention rely on the application of pressure, and in certain instances, temperature above ambient, to the aqueous coating composition produces a coating film surface which substantially conforms to the surface of the coating face. The result is a method which produces exceptionally high-gloss coatings from standard aqueous coating compositions.

Use of the present invention allows a standard aqueous coating composition to be deposited onto a printing surface in virtually any printing process with the resulting coating producing a high gloss finish not otherwise obtainable. The present invention is readily adaptable to virtually every type of coating process used to coat inked or ink-free printing surfaces. The coating may be placed directly on a naked (i.e., non-inked or ink-free surface) or over an ink layer, including after a first UV ink layer is applied.

BACKGROUND OF THE INVENTION

Methods for applying wet coating compositions to paper surfaces followed by drying the wet coating with a heated solid polished reflective finish roller for reproducing high gloss finishes in the paper making industry is known. The process is referred to as cast coating or calendaring. The cast coated method employed during paper making produces a high gloss coating image by first applying a wet coating composition to a paper web substrate before it contacts a casting drum (i.e., a heated drum having a highly polished drying surface which creates a glossy image on the paper. In contrast, the present method applies a wet coating composition inline (wet or dry trap) directly onto a smooth, reflective or polished, low energy non-stick surface followed by transferring the coating composition onto the substrate. The cast coated paper, after it is manufactured by the paper mills, is then sold to printers and is used as a high gloss substrate for use in printing applications. In these applications, ink is deposited onto the high gloss cast coat finish in order to create ink images for graphic reproductions.

The use of a heated polished mirror-like finished roller for achieving high gloss finishes to a printed surface, as a separate application, off-line after the printing process and after the inks and coating have been thoroughly dried is also well known in the printing industry. The equipment used for the above application is manufactured by Matsumoto Kikai Manufacturing Company, Ltd., Tokyo, Japan and Billhoefer, New Jersey, U.S.A.

Aqueous coating compositions of a resinous thermoplastic coating material (clearcoat) such as thermoplastic, (meth)

acrylic or (meth)acrylic-styrene copolymer or related copolymers in the form of emulsions are well known in the printing industry and presently are being used to coat inked and uninked layers during wet-trap in-line, off-line dry-trap, gravure, offset, silk-screen, flexography and related printing or coating processes.

The prior art printing methods which utilize aqueous coatings are disadvantaged in the gloss values which can be obtained. At the same time, the demand for high gloss graphics is rapidly growing, especially for use in magazine covers, packaging materials, paperback books and labels, among numerous other end use applications. At present, the use of UV curable and electron beam curable coatings, among others, are used in high gloss applications to meet the needs of the industry. These methods suffer from the disadvantage that the coating must be cured upon deposition, creating time constraints in manufacturing with a resulting compromise in productivity. In addition, the monomers which are used in these applications to create coatings tend to be hazardous and raise serious health and environmental issues in their continued use. In addition to other negatives, these methods are often very costly compared to aqueous coating methods. In addition to inline single coating units, expensive methods such as inline double coating units are also offered by a numerous printing press manufacturers in an effort to achieve high end results from inline wet or dry trap printing methods.

Today's demand for higher gloss graphics such as magazine covers, packaging materials, paperback books and labels, among other applications, is rapidly growing and represents a tremendous commercial opportunity. Printing press manufacturers such as KBA-Planeta, Komori, M.A.N. Roland, Mitsubishi, Heidelberg and Bobst, offer new press equipment with inline coating units allowing for wet or dry trap coating applications.

Coating materials employed for the above applications include aqueous based, U.V. curable and electron beam curable coatings (both aqueous and non-aqueous based), among others. In addition to inline single coating units, expensive methods such as inline double coating units are also offered by the above printing press manufacturers in an attempt to achieve high end results for inline wet or dry trap coating processes. Notwithstanding the technical efforts made by the press manufacturers, aqueous coating based processes prior to the present invention, provided lower levels of gloss compared to other printing methods.

OBJECTS OF THE INVENTION

It is an object of the present invention to provide a method for depositing an aqueous coating composition onto an ink or ink-free surface in numerous traditional printing processes including wet trap inline sheet-fed printing, sheet-fed offset printing and heat-set offset printing, dry trap inline flexographic printing, offset web-fed printing and gravure printing, among others, which results in a high gloss coating. It should be noted that UV aqueous and non-aqueous coatings and inks can be employed in the above-described processes.

It is another object of the present invention to provide a method for depositing an aqueous coating composition onto an inked or ink-free surface using traditional printing processes to produce high gloss coatings which have not been attainable using an aqueous coating in such processes.

It is an additional object of the present invention to provide in at least one aspect an economical method of producing high gloss coatings on inked or ink-free surfaces using traditional printing processes.

It is yet another object of the present invention to provide in at least one aspect, a method for producing a high gloss coating which utilizes aqueous coating composition containing a substantial absence of volatile organic compounds or VOC's onto an ink or ink-free substrate in numerous printing processes.

It is still another object of the present invention to produce MVTR (Moisture Vapor Transmission Rate) barrier coatings with the present process.

These and other objects of the present invention may be readily gleaned from the description of the present invention which follows.

BRIEF DESCRIPTIONS OF THE INVENTION

Figure 1:
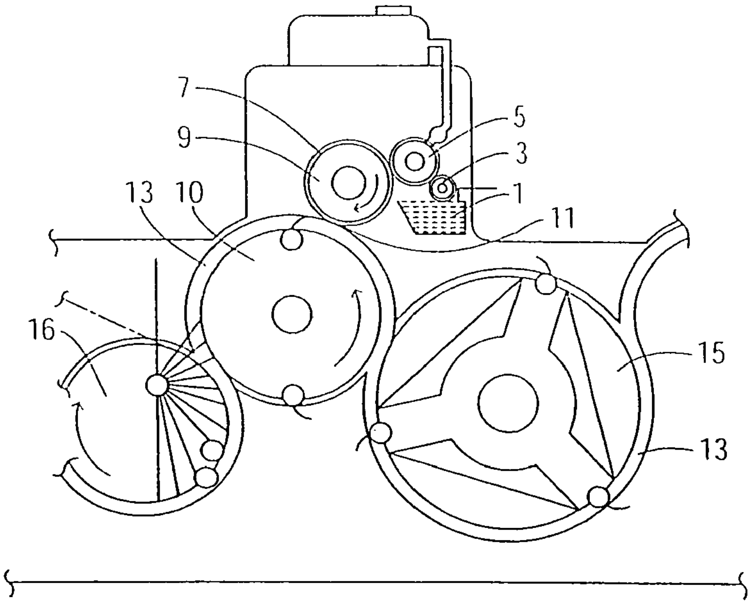
FIG. 1 provides a pictorial representation of an in-line coating unit having a gap or nip area for single coating applications.

The present invention relates to a method for depositing an aqueous coating composition in the form of a solution, dispersion or emulsion onto an inked or ink-free layer in an inline printing process including wet trap inline sheet-fed printing, web-fed offset printing, dry trap inline flexographic printing, heat-set offset web-fed printing and gravure printing, among others. Thus, according to the present invention, an aqueous coating composition is deposited onto an inked or ink-free substrate using a low energy smooth surface coating face on a blanket cylinder under pressure and optionally, increased temperature while in contact with the coating face to produce a coating film after deposition which exhibits a gloss value of at least about 50° reflection, preferably at least about 70-80° and in certain cases, 90° or more.

In accordance with at least one aspect of the present invention, the present method is directed to coating a substrate (inked or uninked) with an aqueous coating composition in a traditional inline printing technique which utilizes a coating face cylinder having a low energy, smooth, wettable, non-stick surface which preferably has a mirror-like (reflective) or optical quality surface, to produce a high gloss coating on the substrate. The printing techniques which may be used in the present invention include for example, wet trap inline sheet-fed printing, web-fed offset printing, heat-set offset printing, dry trap inline flexographic printing, offset web-fed printing and gravure printing, among others. Essentially any printing method which utilizes a blanket coating face or cylinder face to deposit an aqueous coating onto a substrate may be used in the present invention.

In accordance with one aspect of the present invention, the method is directed to coating a substrate (inked, including UV inked or uninked) with an aqueous coating composition in an inline printing process including wet trap inline sheet-fed printing, web-fed offset printing, dry trap inline flexographic printing, offset web-fed printing and gravure printing, among others.

In one aspect, the present invention comprises the steps of:

1). Applying an aqueous coating composition onto a low energy, reflective surface coating face of a blanket or coating cylinder in an inline printing process in an amount effective to coat an inked or ink-free substrate, said coating composition being sufficiently wettable to spread evenly over said blanket or coating cylinder; and 2). Transferring said coating composition from said coating face onto an inked or ink-free substrate surface having a surface energy which is higher than said blanket coating under an amount of pressure and temperature and for a period of time effective to produce a substantially tack-free coating at the interface of said coating face and said substrate surface, said coating conforming substantially to said surface, said coating face surface having sufficient release characteristics to allow said coating to be completely transferred from said coating face surface to said substrate.

In the present invention the coating face is preferably a wettable, low-energy reflective (mirror-like) surface which interacts with the coating to be deposited. It has a surface energy which is significantly below the surface energy of the substrate onto which the aqueous coating composition is to be deposited. By utilizing pressure and, in certain instances, a temperature above ambient temperature to deposit the aqueous coating composition, the coating which is applied to the substrate surface from the coating face (either from a blanket surface or cylinder surface) creates a surface after application, which conforms to the surface of the coating face. In addition, application is so efficient that, virtually no aqueous coating is left on the coating face after the coating composition is applied to the substrate.

In the present invention, the coating face is preferably a non-stick, low energy reflective (mirror-like) surface, which preferably has an optical quality to its surface.

The various methods according to the present invention may be readily adapted to utilize numerous aqueous compositions containing optional components including mar or scuff resistant agents, hardening agents, coalescing agents, plasticizing agents, defoaming agents and pigments, among others, which are added in effective amounts to provide the desired results.

The use of the present invention allows for reproducing unexpectedly smooth high gloss finishes to printed or unprinted substrates. One of the methods according to the present invention is directed to applying an aqueous coating composition onto a coating face substrate which is mounted onto a press coating cylinder and then transferring or depositing the aqueous coating composition from the coating face onto a printed or unprinted substrate under pressure at ambient temperature. During the step of transferring the coating onto the substrate, pressure and in certain instances, elevated temperature, is applied to the thin coating film while the coating is in contact with the coating face, thus allowing the film of the coating composition to dry to a tack-free semi-dry state as the coating is being squeezed between the nip of the coating face cylinder and the substrate on the impression cylinder. The use of pressure and optionally, increased temperature results in a substantially tack-free coating which readily releases from the coating face onto the substrate.

In an additional embodiment of the present invention, a further single coating method of the present invention allows a wet applied coating film to dry at the nip as it is being squeezed between the coating face cylinder and impression cylinder during the time it takes to transfer the coating composition from the coating face onto the substrate as the substrate travels through the press.

In another embodiment, the present method may be adapted for use during inline printing and coating processing when an aqueous coating is transferred to a substrate over a wet or dry ink film. In this method, an ink image is applied to a substrate in a first step in a first printing unit and the substrate containing the image is then sent to the succeeding or second press unit where an aqueous coating composition is applied to the dried inked substrate surface. In this method, the aqueous coating, which has been applied to the coating face of the coating cylinder (i.e., on the blanket surface attached to the coating cylinder or directly on the cylinder surface), is deposited onto the wet or dried inked substrate surface and transferred to the substrate surface under pressure and optionally, increased temperature, as the substrate travels through the printing press. In this method, like the other methods of the present invention, pressure and optionally, temperature, result in the deposited coating being dried to a tack-free coating at the nip. It should be noted in multicolor printing the ink image is applied to the substrate by more than one printing unit and the aqueous and/or non-aqueous coating composition is applied as the last step.

In another aspect of the present invention, the present invention may be adapted to produce a high gloss coating in a wet-trap or dry-trap process as the coating composition is trapped over wet or dried ink. In this aspect of the present method, after a first step in which an ink (hydrophilic or hydrophobic, including oil soluble) is transferred onto a substrate in a first printing unit, in a second printing unit a coating (preferably aqueous, but which may be non-aqueous) is coated onto the ink surface which still may be wet (wet-trap) or which is dried (dry-trap). In this aspect of the present invention, the coating composition may comprise UV or heat polymerizable monomers and/or oligomers (especially where the coating is non-aqueous) which are deposited onto the substrate surface and simultaneously dried and, in certain instances, polymerized under pressure and temperature and/or light at the nip to produce a tack-free surface which provides an exceptionally high gloss level. Polymerization of the UV monomers and/or oligomers in the coating preferably are polymerized at the nip at the same time that the coating is dried or optionally, the coating may be polymerized in a subsequent polymerization step.

In still a further embodiment, the method according to the present invention may be adapted for use in a system which provides a first coating (aqueous or non-aqueous, including a UV ink surface) onto which is deposited a second coating comprised of UV monomers and/or oligomers (aqueous or non-aqueous). In this aspect of the present invention, the first coating is applied as an undercoating (aqueous or non-aqueous), after which time a coating composition (aqueous or non-aqueous) comprising UV monomers is applied under pressure and optionally, temperature and UV light to produce a high gloss finish coating. In this aspect of the present invention, a first ink layer or image may be deposited onto the substrate before a first coating (aqueous or non-aqueous) composition is applied. Polymerization of the second coating containing UV polymerizable monomers and/or oligomers may occur at the nip or in a subequent polymerization step after the coating is deposited.

In yet another embodiment of the present invention, two coating compositions may be applied from two coating stations in the same press; in this coating method, a first coating composition is applied onto a substrate using a reflective, non-stick low-energy coating surface under pressure and optionally, temperature and a second coating is applied to the substrate on the first coating also using a reflective, non-stick low-energy coating surface.

In each of the above methods, in order to obtain a high gloss finish, the coating onto which a high gloss finish is to be produced (which may be the only coating deposited, or, in cases where more than one coating is applied, the final coating among two or more coatings which may include aqueous or non-aqueous coatings) the aqueous coating is applied to the substrate from the blanket or cylinder coating face under pressure and optionally heat in order to provide a tack-free coating with a high gloss finish. In cases where polymerizable monomers and/or oligomers are contained in the coating (which may be aqueous or non-aqueous composition) to be produced in a high gloss finish, polymerization may occur simultaneously with the application of pressure by heating the UV polymerizable material in the presence of an effective concentration of a heat initiatior or by applying an effective amount of UV radiation in the presence of an effective concentration of UV light or in a subsequent polymerization step. In the case where the final coating composition is aqueous or non-aqueous UV monomers, the monomers may also applied from a traditional blanket surface.

In the present method, it is preferred that setting or drying of the coating should occur during transfer from the blanket or cylinder coating face but before one revolution of the press cylinders takes place.

In the various embodiments of the present invention, one or both of the aqueous coating compositions and one or more press cylinders, especially including the coating cylinder, may be employed at ambient or elevated temperatures, depending upon a number of variables which shall be discussed in greater detail hereinbelow. In addition, press cylinders may be designed to increase the temperature of the cylinder surface, for example, by hollowing out the cylinder interior and allowing an appropriate liquid to circulate through the hollow interior as a means for providing temperature control. In addition, the cylinders may be made of UV-transparent plastic to allow UV light to be applied to certain UV polymerizable coatings in a polymerization reaction. Alternatively, hot air impingement may be used by forcing hot air onto the coating face after the application of coating from the application roller onto the coating face but before depositing onto the substrate.

A number of aqueous coating compositions may be used in the present invention, including for example, non-curable and curable coatings, including UV curable coatings, UV cationic coatings, catalytic coatings and/or electon beam-type coatings (i.e., coatings which are curable by electron beam radiation).

In certain aspects of the present invention utilizing a blanket face to transfer coating onto a substrate, the reflective, non-stick low-energy blanket coating face attaches to the press coating cylinder and may be employed in any sequence for single or double coating applications, although preferably, the reflective non-stick low energy blanket face is used to apply the final coating in the process. This preferred method generally produces the highest gloss finish.

DETAILED DESCRIPTION OF THE INVENTION

The following terms shall be used to describe the present invention.

The term "printing" is used to describe a process for depositing an aqueous coating or ink onto a substrate. In the present invention, any printing method which deposits an aqueous or non-aqueous coating onto a substrate using a cylinder which can accomodate a low energy, non-stick, polished surface and applies the requisite pressure and in certain instances, increased temperature on the coating, may be used. Exemplary printing processes for use in the present invention include, for example, offset printing, wet trap or dry-trap inline sheet-fed printing, web-fed offset printing, dry trap inline flexographic printing, heat-set offset printing, heat set web printing and gravure printing, among others, including offline dry trap printing and UV dry-trap printing.

The term "substrate" is used to describe any flexible or inflexible surface upon which aqueous coating compositions according to the present invention may be deposited in order to produce high gloss coatings. Substrates useful in the present invention include paper, paperboard, cardboard, plastic sheeting, among numerous other surfaces.

The term "offset printing" is used to describe an indirect printing process well-known in the art. The process of offset printing is considered "indirect" because impressions are not made directly from ink images on the plate. In offset printing, the ink image never touches the substrate, rather, it is deposited onto the surface of a rubbery or elastomeric blanker cylinder with each revolution. The substrate receives the ink image from the rubbery blanket cylinder as the substrate goes through the press between the blanket and impression cylinder. The impression cylinder is the surface backing up the substrate as the blanket squeezes or presses against it allowing for transferring the ink image onto the substrate. The plate cylinder, blanket cylinder and impression cylinder of a sheet-fed offset printing press are manufactured with a gap area. The gap area allows sheets to transfer from one printing station to another and also allows the gripper bars to carry the individual sheets through the press to the delivery pile and drop them in position for jobbing. The gap area also permits the printing plate and printing blanket to be mounted or attached to the press cylinders to allow for printing reproduction.

The term "heat-set offset printing" is used to describe another printing process in which the present method may be used. In heat-set offset printing, the press operation differs from offset sheet-fed printing in that the need for gripper bars to carry individual sheets through the press is not required because the web substrate travels through the press under tension created and controlled by the in-feed and nip rollers. Heat-set offset presses can be used for two-sided printing because they are capable of reproducing ink images on each side of the web as the web is fed through the press. This process is referred to as perfecting and is accomplished by the blanket to blanket principle of construction, with one unit above another. When the paper passes between the blankets it is printed on both sides, one blanker cylinder acting as the impression cylinder for the other. Some perfecting web-fed presses such as the M3000 manufactured by Heidelberg, among others, have gapless cylinders where the plate and blanket cylinders are completely round.

In addition to heat-set offset printing presses, one-sided offset printing web-fed presses are also used in offset web printing. These presses are manufactured by Chambon, among others. The principle of construction for a one-sided offset printing web-fed press includes a plate cylinder, a blanket cylinder and an impression cylinder. In this arrangement, the impression cylinder is not used with a rubber blanket mounted on it. Instead, the impression cylinder is a completely round stainless steel cylinder dedicated to be in contact with the back side of a substrate as the substrate and blanket cylinder squeeze against it.

The term "flexography" is used to describe a method of web-fed printing. In flexography, printing is done directly from resilient relief plates made of material such as rubber, synthetic rubber, plastic, photopolymer and synthetic polymer manufactured by DuPont (under the Cyrel trademark), among others. After it is developed, the image area of a flexographic plate exhibits a raised surface that carries fluid inks to a substrate. The plates are single sheets which are mounted on a completely round gapless press cylinder by an adhesive backing. In the flexographic process, the freshly printed ink is dried before it comes in contact with the next wet ink or coating film. This is referred to a dried trap process.

The term "gravure" refers to a printing process which is a dried trap process which reproduces ink images from etched or engraved surfaces of a printing cylinder. In gravure printing, the printing image consists of tiny recessed cells. The gravure press is designed with an ink pan or fountain in which the printing cylinder is immersed, a doctor blade which removes excess ink from the surface of the printing cylinder and an impression roller which brings the substrate into contact with the printing cylinder.

The term "setting" is used throughout the specification to describe a phase change that an applied coating film goes through while it is still in contact with the coating face substrate and before it releases onto a printed or unprinted substrate in a coating process according to the present invention. By way of reference, an increase in viscoisty of the coating film takes place by virtue of solvent evaporation allowing for quick setting or drying before the film releases or transfers onto a printed substrate.

The term "coating film" or "applied coating film" is used to describe a coating composition after it has been applied from a bulk or mass form onto a substrate and is converted into a thin layer of film (with virtually no solvent remaining in the coating). The film characteristics of the coatings related to the present invention are determined by the type and amount of the individual components of the coating, the quality of the surface of the coating face substrate and the temperature and pressure at which transfer occurs. The term "coating" is used to describe coating composition which has been deposited onto a substrate and may refer to a coating which is wet (i.e., contains solvent or unreacted monomer in appreciable amounts) or dry (substantially devoid of solvent or unreacted monomer).

The term "ink" is used as it is normally used in the art to describe a colored aqueous-based or non-aqueous based liquid used to print a surface. Inks for use in the present invention may be oil-based, water-based, solvent-based inks and UV inks among others. The inks may be hydrophilic or hydrophobic. The term "inked" refers to a substrate onto which an ink has been deposited in either a wet or dry state.

The term "reflective" or "mirrored finish" refers to the surface of a coating blanket or coating cylinder, among others, from which aqueous coating is to be transferred onto a substrate such as paper or cardboard in the present invention. In preferred aspects according to the present invention, the coating blanket surface or coating cylinder has a reflective or mirror finish of optical quality and a measured surface smoothness Ra ranging from 0 to about 6-7 microns, preferably no greater than about 4 microns, more preferably no greater than about 2 microns. A mirrored surface Ra approaching 0 is particularly preferred. The symbol "Ra" is a surface texture parameter well known in the art (International Standard 468) and is the arithmetical mean deviation of the profile. It was formerly known as the arithmetic average deviation "AA" or the center line average deviation "CLA". This is defined as the arithmetical mean of the absolute values of the profile departure within the sampling length. In practice, the values of Ra are determined within the evaluation length which includes several consecutive sampling lengths. The sample length is equal to the cut-off length in meter determinations. The center line, or arithmetical mean line of the profile, is a reference line representing the form of the geometrical profile and parallel to the general direction of the profile throughout the sampling length, so that within the sampling length the sum of the areas limited by the centre line and the profile are equal on both sides. Equipment which can be used to measure Ra for purposes of the present invention includes the Surf-test 301 by Mitutoyo Company of Japan as well as the Surf-test 211, also by Mitutoyo.

The terms "reflective" or "mirrored finish" as used herein refers broadly to a surface which exhibits a reflectiveness which ranges from minute to mirror (including highly polished, optical quality). In other aspects of the present invention the coating blanket surface is a "smooth" surface. The term "smooth" refers to a surface which, although not at a level of optical quality, still provides a high gloss finish of the substrate coating of at least about 50° reflection, preferably at least about 70° reflection and even more preferably at least about 90° or higher reflection.

The term "gloss" or "high gloss" is used throughout the specification to describe the quality of the coating surface on a substrate defined by its reflection of light. The term "high gloss" refers to a coating after deposition which reads at least about 50° reflection, preferably at least about 70° and most preferably approximately 90° or higher on a Mallincrodt 60° glossmeter. It should be note that when a matte or semi-gloss coating composition is employed, the reflection finish may be less than 50° reflection.

The term "low energy" is used throughout the specification to describe the surface energy of the coating blanket surface or coating cylinder surface (where a coating blanket is not used). In general, the coating surface referred to tends to be a wettable, primarily hydrophobic surface having a surface energy of about 31 dynes/$cm^2$ or less, more preferably less than about 25 dynes/$cm^2$, even more preferably less than about 20 dynes/$cm^2$, still more preferably less than about 13 dynes/$cm^2$ and even more preferably less than about 10 dynes/$cm^2$ and as low as about 0.1 dynes/$cm^2$. As a general rule in the present invention, the surface energy of the coating blanket or coating cylinder is significantly less than the surface of the substrate, which allows for complete transfer of coating from the coating blanket or coating cylinder to the substrate. One of ordinary skill may readily adjust the surface energy of the coating blanket or coating cylinder surface in order to obtain an appropriate non-stick surface for use in the present invention.

The term "wettable" is used to describe the surface of the coating blanket or coating cylinder which transfers the aqueous coating composition onto the substrate. A wettable surface is a surface which will allow an aqueous coating composition to sufficiently spread out evenly over the entire surface without "beading" up or creating localized concentrations of coating composition over the surface, thus producing a smooth, even final coating on the substrate. It is noted here that coating compositions which may contain small pinholes after being deposited on the coating blanket or coating cylinder, but which produce high gloss coatings are covered by this definition of wettable.

The term "non-stick" is used throughout the specification to describe the coating blanket or coating cylinder surface. By non-stick, it is meant that during transfer of the coating composition onto the substrate from the coating blanket or coating cylinder, the surface provides no resistance to such transfer resulting in essentially no (as visualized by the naked eye) coating (preferably aqueous coating) composition being left on the coating blanket or coating cylinder surface. Note that a dried aqueous coating film will not bond or anchor to the surface even if left for 24 hours (i.e., the dried coating can be removed from the surface will relatively little energy).

One of the more favorable characteristics of the the coating face (blanket or cylinder) profile in the present invention is the low energy, non-stick surface which prevents the coating composition from adhering or sticking to the surface during a coating process when pressure and, optionally, elevated temperature is applied to enhance evaporation of solvent to provide high gloss coatings. This is accomplished by creating a wettable, low surface energy level release coating face which exhibits poor bond and non-stick characteristics allowing for a greater amount of the applied wet coating film to release and transfer onto the substrate being coated.

A direct relationship between a low surface energy blanket or cylinder coating face and the release and transfer characteristics of an aqueous coating composition in the present invention has been established. In order to distinguish the coating surfaces of the present invention with those of the prior art, the following test method was conducted: AccuDyne™ test marker pens were employed to measure the surface energy, in dynes per square centimeter (dynes/$cm^2$) of the present invention compared to well-known prior art coating blanket surfaces. The fluids used in the AccuDyne test marker pens were based on those specified in ASTMD 2578-84. The following steps were employed to measure the surface energy of the coating face surface of the present invention with those of the prior art.

1. The surfaces to be measured were wiped clean by employing isopropyl alcohol with a cheesecloth wiper pad.

2. The surfaces were then dried with a dry cheesecloth wiper pad.

3. The prepared surface was then measured. The following table sets forth the measured values for a number of prior art blanket coating surfaces.

| Manufacturer/ Distributor | Substrate Style | Application Class | Surface Energy Dyne Level (dynes/$cm^2$) | Present Invention Surface Energy Maximum |
|---|---|---|---|---|
| Reeves Int'l | 2000 | Ink or Coating | 50 | 31 |
| Reeves Int'l | Reflections | Ink or Coating | 50 | 31 |
| Reeves Int'l | Irio | Ink or Coating | 33 | 31 |

-continued

| Manufacturer/ Distributor | Substrate Style | Application Class | Surface Energy Dyne Level ($dynes/cm^2$) | Present Invention Surface Energy Maximum |
|---|---|---|---|---|
| Day Int'l | 3000 | Ink or Coating | 60 | 31 |
| Day Int'l | 8500 | Ink or Coating | 50 | 31 |
| Day Int'l | 9500 | Ink or Coating | 50 | 31 |
| David M | QL-Green | Ink or Coating | 50 | 31 |
| DYC | S-7000 | Ink or Coating | 50 | 31 |
| DuPont | Cyrel | Ink or Coating | 50 | 31 |
| Polyfibron Tech | Polyfibron | Ink or Coating | 38 | 31 |
| Oxy-Dry by | Easy Lack | Coating | 38 | 31 |

The test revealed that when employing the ACCU-DYNE™ test marker pens (Diversified Enterprises, Claremont, N.H.), the surface energy of the surface of the coating face of the present invention was 31 $dynes/cm^2$ or less, clearly evidencing that the surface energy of the coating face in $dynes/cm^2$ of the present invention is significantly lower than all of the surfaces employed in today's practice.

The term "release" is used to describe the blanket coating surface or the cylinder coating surface which releases aqueous coating as the coating is being deposited onto the substrate surface. Preferred blanket or cylinder coating surfaces to be used in the present invention exhibit a measured release value ranging from about 1 to about 5,000 grams, preferably about 1 to about 2500 grams, more preferably less than about 500 grams within this range as measured by the TESA type #7475 procedures.

The TESA 7475 Test is standard test well known in the art which utilizes a single coated clear 0.005 PVC film with acrylic adhesive lined with a silicone coated paper. The tape is preconditioned in the the test laboratory at standard temperature and humidity for at least 24 hours before beginning the test. Using a 1 inch wide×10-12 inch long tape apply to stainless steel (using ASTM D3330/PSTC 1 method) in order to determine the base line, from which the later adhesion values can be compared. This can be done at 90° C. (using PSTC 5 equipment) or 180° depending upon the method used later. Sample strips of test tape and release coated substrate under evaluation are brought into intimate contact, then aged at elevated temperature for 24 hours at 70° C. under pressure of 3 pounds per square inch. Up to ten samples can be stacked one on top of another. Allow to cool for at least 2 hours. Separate the aged and cooled 7475 tape and liner manually at slow speed so as not to disrupt the adhesive tape. Then perform an adhesion to steel in the usual manner, using the same angle of peel used initially. A comparison of the original adhesion and aged adhesion gives a measure of the loss of adhesion or the release of the material.

The term "release" referred to by printing blanket manufacturers relates to the way a substrate detaches itself from the wet ink film and surface of a printing blanket during transfer of the substrate. The surface profile of traditional printing blankets are not designed to exhibit poor bond or non-stick properties. In addition, the ink chemistry in an offset or letterpress printing process is comprised of oil based vehicles such as those manufactured by Magie Brothers Oil Company, among numerous others.

The open time, setting, tack and drying characteristics of oil-based inks (also referred to as paste ink) are distinguishable from the open time, setting, tack and drying characteristics of aqueous coating technology. In the process using oil-based inks, the ink setting takes place when the solvent evaporates from the ink or being absorbed by the paper after the ink is printed. The tack of the ink film in terms of its resistance to split off or be released from the surface of a printing blanket exhibits substantially less force when compared to aqueous coating technology.

In order to dry a wet ink film in the traditional oil-based ink process, a catalyst or drier is often needed to acceerate the oxidation and polymerization of the oil vehicles employed, thus allowing for the wet ink film to dry in several hours after application. We compared the open time, setting, tack, drying chracteristics and the force required to detach or release a paper substrate from a wet inked and wet coating film applied to the surface of a printing blanket. The following test was employed:

First, a wet ink film (which produces a reproduceable film after drying by standing at ambient temperature for approximately 24 hours) is applied to the surface of a printing blanket employing a Little Joe offset proving press onto a 6×8 inch-3 ply Day International style 9500 compressible printing blanket followed by immediately placing an 70 lb. coated paper substrate onto the wet inked film and pressing the paper against it using a roller immediately followed by placing a 3×6 inch 2 lb. weight on top of the 70 lb. coated paper substrate. The paper remained in contact with the wet ink film for 24 hours in order to observe the degree of force it takes to lift the paper from the ink blanket. The test revealed that when the paper was pulled from the free end, it exhibited extremely minute force when releasing or detaching the paper from the ink blanket.

The test was repeated employing a wet waterbase coating film of equal thickness from five different water coating compositions using the same printing blanket as described above. Each of the compositions exhibited varying amounts of solid content—from about 25% by weight solids to an increasing percentage of solids in 10% increments up to about 65% by weight solids. Each coating composition comprises a (meth)acrylic styrene copolymer manufactured by SC Johnson polymers (commercially available as the Joncryl® polymers).

The test revealed that when pulling the paper off the surface of the coated printing blankets (aqueous coating composition), the paper exhibited a substantial amount of fiber tear leaving portions of the paper fibers bonded to the blanket surface. This clearly indicates that the open time, setting, tack and drying characteristics and the force required to detach the paper substrate from the blanket surface evidences that there is no similarity between ink chemistry and water base coating chemistry with respect to the amount of release required to detach the paper substrate from the printing blanket surface.

The term "nip" is used throughout the specification to describe the junction or point at which the coating cylinder and impression cylinder meet as the substrate passes between the two cylinders under pressure.

The term "gap" is used to describe the area on the coating cylinder which is not covered by a coating blanket face for depositing aqueous coating.

The term "transfer" is used throughout the specification to describe the process by which aqueous coating is applied to the substrate surface from the coating blanket or coating cylinder. As used in conjunction with the present invention, the transfer of coating from the coating blanket or coating cylinder to the substrate is a complete transfer—essentially no visible coating is left on the coating blanket or coating cylinder after transfer.

The term "tack-free" is used throughout the specification to describe the coating composition which has been deposited onto a substrate after the application of pressure and, in certain instances, elevated temperature and/or UV light. Tack-free coatings are coatings which do not evidence a sticky feel, a characteristic which has been found to impair the complete transfer of a coating from the coating blanket or cylinder onto the substrate.

The term "simultaneous" is used throughout the specification to describe the process of applying pressure and, in certain instances, temperature above ambient and/or UV light to the coating as it is being transferred from the blanket or cylinder coating surface to the substrate. The term simultaneous means exactly at the same time or shortly after the coating is transferred from the blanket coating face to the substrate. In the present invention, deposition of the aqueous coating, followed by application of pressure, and optionally, temperature above ambient or UV light is preferably complete within a single rotation of the blanket cylinder of a printing press.

The term "coating blanket" is used to describe a polymeric, metallic or other material which is placed tightly on and generally, although not always, completely around a coating cylinder and is used to deposit coating onto the substrate surface. Coating blankets according to the present invention have low energy, non-stick smooth, preferably reflective surfaces, which produce high gloss aqueous compositions after deposition. Coating blankets according to the present invention may be single layer or are preferably laminated in order to provide strength, flexibility, mechanical features and other features in addition to the low energy, wettable, smooth surface, which is used to provide high gloss coatings according to the present invention. Coating surfaces (coating blanket or cylinder) used for depositing coatings in the present invention may be designed from single pieces of flexible materials which are mounted onto a printing press cylinder which is manufactured with a gap area. The construction may be designed in several ways. For example, a flexible coating blanket face may be constructed in multi layers thus allowing for stability, gauge consistency and minimized shrinking. The blanket may be constructed with or without a compressible layer. In addition, the coating blanket surface may be bonded onto metal or plastic backing or constructed with an adhesive backing or to strip off in unwanted areas when spot coating is required.

In another embodiment according to the present invention, the blanket may be fitted with a heating element by employing thin flexible type heater elements, sandwiched between the coating face front side and the backing on the second side. Alternatively, the flexible type heater elements may be employed as part of the componentry to create and under blanket or under packing substrate which is capable of being attached to the printing press cylinder for heating the coating surface substrate to a set value. This is accomplished after the coating face substrate is mounted onto the press cylinder positioned on top of the heat under the blanker or packing substrate. In addition heat impingement using an electric air knife, or air blower which blows hot air onto the coating face cylinder may be used to heat coating film which has been deposited onto the coating face.

In the case of a flexible coating face designed from a plastic substrate, the coating face may be constructed with or without a backing or it may be constructed with an adhesive backing, for example. If a backing is desirable, the coating surface (face) may be bonded to metal, metal alloy, rubber or fabric as a backing. In addition, the surface may be constructed to strip or peel off in unwanted areas when spot coating is required. In the case of printing presses which are designed without gap areas in the coating face such as gravure, offset web printing, such as the M3000 manufactured by Heidelberg, among a number of others, the coating face may be constructed as a cylindrical sleeve capable of being installed on or off a printing press or as a fixed coating face cylinder.

Exemplary materials which are used to provide a coating blanket face or surface with the appropriate physical and release characteristics according to the present invention include, for example, any material including polymeric material or a mixture of polymeric and metallic material which can be provided with a sufficiently smooth, wettable surface to provide aqueous coatings with a high gloss finish. Preferred materials for use in the present invention include, for example, polyurethane elastomers, polyesters, especially hydrophobic polyesters which have been conditioned with a release agent, polyethylene terephthalate (PET), polyvinyl chloride, polystyrene, polysilicone, including silicone (meth)acrylate, metallized plastics, such as metallized polyethylene terephthalate, including alloy metal (preferably, nickel) surfaces, such as the Nedox® coatings available from Magnaplate Corporation, Linden, N.J., USA, fluoropolymers including ethylene-chlorotrifluoroethylene (ECTFE), fluorinated ethylene propylene (FEP) such as Karton® FEP type RF coating and sheets available from Norton Performance Plastics, Wayne, N.J., USA, ethylene tetrafluoro ethylene (ETFE), polytetrafluoroethylene (PTFE), polyvinyldifluorine (PVDF), perfluoroalkoxy (PFA), polyvinyl alkoxy (PVA), among others. The fluorinated polymers are preferred for use in the present invention because of their tendency to exhibit excellent release characteristics and acceptable wettability.

In providing preferred coating blankets and coating cylinders having a high reflective, low energy, non-stick surface for the deposition of aqueous compostions onto a substrate, the surface is generally prepared by a number of processes well known in the art including casting, calendaring, polishing among others to create the appropriate finish of the coating surface.

The term "coating cylinder" is used to the cylinder in a printing press which is used to deposit coating onto a substrate. A coating cylinder may have a blanket wrapped around its surface, or alternatively, the coating cylinder may define a surface or face onto which an aqueous coating composition is applied and then deposited onto the substrate.

The terms "coating blanket face" and "coating blanket surface" as used herein are synonymous terms to describe the low energy, smooth (in certain instances reflective or mirror-like) surface of the coating blanket which is used to deposit coating onto the substrate.

The term "coating cylinder face" or "coating cylinder surface" as used herein are synonymous terms to describe the coating cylinder surface which is used to deposit coating in the absence of a coating blanket. Coating cyclinder surfaces according to the present invention comprise stainless steel, aluminum and alloys, among others, all with enhanced release characteristics.

The term "temperature" shall mean ambient temperature and temperatures above and below ambient temperature. Where no reference to temperature is made, the process is generally used at ambient temperature. Where a reference to temperature is made without further reference, the temperature is generally considered above ambient temperature. The present method may be used at any temperature, i.e., below ambient temperature, at ambient temperature and above ambient temperature which temperature may range from below ambient temperature to temperatures of several hundred degrees celcius or more (up to about 500° C. or more). Temperature may be adjusted in conjunction with the pressure utilized in order to produce an optimum combination of pressure and temperature to produce high gloss coatings according to the present invention. Temperature and pressure, as well as press speed, may be separately adjusted to obtain high gloss coatings according to the present invention. As a general rule for guidance, as the pressure is raised, the temperature applied to the coating may be reduced and as the pressure is lowered, the temperature may be raised. One of ordinary skill will readily recognize to vary the pressure and, in certain instances, the temperature applied to the coating in order to produce high gloss coatings according to the present invention.

The term "pressure" shall mean pressure above atmospheric pressure. Pressures which may be used in the present method to provide high gloss coatings may range from atmospheric pressure (about 760 mm Hg) to several hundred atmospheres of pressure or more, with a preferred range of pressure being about 5 to about 15 atmospheres (about 3800 mm Hg to about 11,500 mm Hg). Pressure settings covered by this definition include press cylinder pressure settings as per printing press manufacturers specifications or settings which may be above or below the suggested settings.

The term "(meth)acrylate or (meth)acrylic" is used throughout the specification to describe a monomer, polymer or copolymer which is or is derived from acrylic acid, methacrylic acid, esters of these acids or mixtures thereof.

The term "aqueous coating composition" is used throughout the specification to describe an aqueous composition in the form of a solution, emulsion or dispersion which is capable of being deposited onto and coating an uninked or inked layer in a printing process according to the present invention. As used in the present invention, an aqueous coating composition preferably contains effective amounts of a pre-polymerized film forming polymer, either a low molecular weight film-forming polymer and/or a high molecular weight film-forming polymer, a surfactant and/or emulsifier and an aqueous solvent, usually, but not exclusively, comprising a mixture of water and at least one additional solvent which may promote the speed of drying of the solvent and/or lower the surface tension of the coating during transfer, and optionally other components which may affect or improve coating characteristics. Alternatively, instead of containing prepolymerized film-forming polymers, the aqueous coating composition may contain UV or heat polymerizable (curable) monomers, oligomers and/or polymers which ultimately are polymerized generally after the coating compostion is deposited onto the substrate.

The term "uninked" refers to a substrate which does not contain an ink coating or image. Substrates which may contain at least one uninked coating (coated with clear coating in the absence of ink or pigment) are understood to be uninked substrates for purposes of the present invention.

The term "coating composition" is used to describe any composition which is applied to a substrate surface which produces a coating. Such composition may be aqueous or non-aqueous and may contain pre-polymerized film-forming polymers or polymerizable monomers, oligomers and/or polymers and optionally other additives including a surfactant and/or emulsifier and a solvent, among numerous other additives.

The term "volatile organic compound" or "VOC" is used throughout the specification to describe most volatile solvents other than water which are used in the aqueous coating compositions according to the present invention. VOC's include, for example, methanol, ethanol, isopropanol, acetone, methylethylketone, various esters including methyl acetate, ethyl acetate, propyl acetate, among others, including chlorinated hydrocarbons, various ethers and alkanes, among others. In preferred embodiments according to the present invention, the amount of VOC is minimized to no greater than about 15% by weight of even lower, in order to respond to environmental concerns about these compounds.

The terms "film-forming polymer" and "film-forming resin" or "resin" are used synonymously throughout the specification to describe the low and/or high molecular weight polymers or resins which are added to the aqueous coating compositions according to the present invention to instill favorable film characteristics to the dried coating. Film-forming polymers for use in the present invention include thermoset resins, thermoplastics, UV-cured film-forming polymers, polymers which may be cured using electron beam energy and mixtures of these film-forming polymers or resins.

The term "low molecular weight film-forming polymer" is used to describe a film-forming polymer which has an average molecular weight ranging from about 100 to about 20,000-25,000, more preferably about 1,000 to about 15,000.

The term "higher molecular weight film-forming polymer" is used to describe a film-forming polymer which has an average molecular weight ranging from about 25,000-30,000 to about 10,000,000-20,000,000 or higher, more preferably about 100,000 to about 2,500,000.

Preferred low and high molecular weight film-forming polymers used in the present invention generally have acid numbers ranging from about 5 to about 800, more preferably about 100 to about 750, and a Tg ranging from about −75° C. to about 150° C. Polymers which have higher Tg's tend to have better release characteristics in the present invention and are more likely to produce a tack-free surface. The film-forming polymers used in the present invention preferably evidence good porosity especially when used in a wet-trap inline system (in order to promote evaporation of solvent from the coating during deposition on the substrate) and, depending upon application, may have particle sizes consistent with this porosity of about 1 nanometer to about 20 microns. In addition to the above characteristics, the film-forming polymers used in the present invention preferably evidence good flexibility within the range (both direct impact and reverse impact) of about 5" per 1 lb. to about 160" per 1 lb. Aqueous coating compositions according to the present invention preferably evidence acid numbers in the range of about 5 to about 800 and a pH in the range of about 2 to 12, preferably within the range of about 5-8.

Generally, the amount of low molecular weight film-forming polymer will range from about 0% to about 100% by weight of the combined weight of low and high molecular weight film-forming polymers used in the aqueous compositions and preferably about 5% to about 95% (more preferably about 10% to about 90%) by weight of the combined weight of film-forming polymers. It is noted that aqueous compositions which essentially comprise 100% low molecular weight or high molecular weight film-forming polymer may be used in the present invention. Noted here is the fact that in any population of polymeric compounds, as a consequence of the polymerization process, a small percentage of high molecular weight or low molecular weight film forming polymer may be found in a sample which is predominantly one or the other molecular weight.

The present invention relates to methods for depositing aqueous coatings onto an ink layer to provide a high gloss finish which also preferably exhibits favorable film characteristics such as mar or scuff resistance, durability, rub resistance and gloss. It is an unexpected result that aqueous compositions could be coated onto substrates such as paper or cardboard and attain, in preferred embodiments, exceptionally high levels of gloss, in certain instances as high or higher than about 90° reflectance. This is an unexpected result.

The amount of wet coating film weight which transfers to a paper substrate during a coating application has a direct effect on the final gloss value of the coated substrate. A wet coating film weight of 0.1 lb. per thousand square feet will exhibit a lower gloss value than one which has a wet coating film weight of 0.2 or higher. It should be noted that other factors such as the type of coating employed and the paper absorption may also effect finished gloss value. It should also be noted that wet applied coating film weight may range from about 0.1 to about 3.5 lbs per thousand square feet or higher.

In the present invention, the effect that temperature has on a coating film is completely different from the effect temperature has on a coating composition in a mass or bulk form. The coating may be deposited at ambient temperature or above ambient temperature, including temperatures of several hundred degrees celcius, depending upon the amount of pressure used. It depends upon how much temperature and/or pressure is to be applied to the coating during deposition in order to substantially reduce or eliminate tack from the deposited coating. For example, when a coating film is exposed to above ambient temperature in the present invention, the increase in temperature will increase the solvent evaporation process thus causing the viscosity of the deposited coating to increase before setting and drying takes place. In the case of bulk or mass coating, the exact opposite of this will take place inasmuch as the viscosity of the coating composition will decrease as the temperature is raised. It should be noted that a coating composition viscosity value during application and transfer to the coating rollers (other than a pre-determined value) may be employed.

In one aspect of the present method, an aqueous coating in the form of a solution, dispersion or emulsion is deposited onto a dry or wet inked or ink-free substrate. When the ink to be coated is dried before the aqueous coating composition is deposited, the ink may be any chemical composition typically used in printing, but is preferably insoluble in a hydrophilic (aqueous) solvent and in particular, the polar aqueous solvent or solvent mixtures used in the aqueous coating compositions according to the present invention. Thus, the ink coating may be comprised of hydrophilic or hydrophobic inks (non-aqueous or aqueous based including UV inks, hybride UV inks or other curable inks) as typically used in the printing industry, with the proviso that the dried ink preferably should not be miscible with or soluble in the coating composition used to coat the ink layer, to avoid smudging or smearing. Depending upon the printing process, it may be preferred to use hydrophobic inks (wax-free or containing wax) or hydrophilic inks to impart favorable characteristics to the final coated substrate.

In instances where the printing process employs a wet-on-wet process, for example, a wet trap in-line process, the ink used is wet (i.e., still contains significant amounts of solvent) during the deposition of the aqueous coating. In this process, it may be preferred to utilize a hydrophobic ink. After deposition of the ink layer, the aqueous coating, preferably in the form of a porous coating, can be deposited onto the ink layer. The use of a hydrophobic ink will generally minimize the tendency of the ink to smudge while both layers are still wet, at least in part.

The aqueous coating composition used in the present method employs at least three and preferably four components:

1) a low or high molecular weight film-forming polymer or resin solid in an amount effective to provide adequate film characteristics after deposition (preferably, a mixture of both);

2) an amount of at least one wetting agent and/or surfactant effective to eliminate leveling problems caused by surface tension of the coating during deposition onto the ink layer; and 4) the remainder of the composition comprising an aqueous solvent, preferably, an aqueous solvent containing less than about 15% of at least one VOC and most preferably containing an absence of VOC's.

In general, the amount of film-forming polymer solid (1 and 2, above) used in the aqueous coating composition ranges from about 15% to about 85-90% by weight of the composition, with a preferred range of at least about 35-40% within this range. In general, the more film-forming polymer solid used in the aqueous coating composition, the more favorable will be the dry film characteristics of the final coating, although the amount of pressure and temperature which may be needed to produce a high gloss coating may be greater than when lower solids content materials are used.

Preferably, the low molecular weight film-forming polymer or resin is added in an amount effective to instill resolubility, press performance and wetting characteristics to the coating composition before and during deposition and to instill adequate gloss to the dried coating composition Generally, the amount of low molecular weight film-forming polymer will range from about 0% to about 100% by weight of the combined weight of low and high molecular weight film-forming polymers used in the aqueous compositions and preferably about 5% to about 95% (more preferably about 10% to about 90%) by weight of the combined weight of film-forming polymers.

While not being limited by way of theory, it is believed that the present invention attains such high levels of gloss after the composition is deposited onto the substrate because the combination of heat and pressure which conforms the surface of the aqueous coating to the reflective coating blanket surface orients the film-forming polymers in such a way that the polymers strictly conform to the mirror surface of the blanket surface, which produces an extremely high gloss finish. Low molecular weight polymers tend to lie flat and more easily conform to the blanket surface than do high molecular weight polymers. Such a flat orientation is believed to enhance, at least in part, the ability of the polymer to reflect light, resulting in a higher gloss value. High molecular weight film-forming polymer, because of its relatively large size, provides durability and integrity characteristics to the coating as well as support for the low molecular weight film-forming polymer, where it is used.

Although aqueous compositions according to the present invention may contain only low molecular weight film-forming polymer or high molecular weight film-forming polymer, it is preferred to provide both low and high molecular weight film forming polymer in aqueous compositions used in the present invention. One of ordinary skill will know to vary the amount and type of film-forming polymer for use in the present invention in order to obtain coatings of exceptionally high gloss levels.

It is thus the combination of low and high molecular weight film-forming polymers which provides many of the favorable film characteristics of the present invention. One of ordinary skill in the art will recognize to adjust the relative weight ratio of low and high molecular weight film-forming polymers in order to instill favorable film characteristics to the dried coating compositions.

A high molecular weight film-forming polymer or resin is preferably added to the aqueous coating composition in an amount effective to support the low molecular weight film-forming polymer and instill some measure of mar resistance, rub resistance, durability and integrity to the dried coating composition alone or in combination with emulsifiers and/or surfactants and optional components such as mar resistance agents and/or hardening agents, among others in a particular coating application. Generally, the amount of high molecular weight film-forming polymer or resin will range from about 0% to about 100% by weight of the combined weight of low and high molecular weight film-forming polymers used in the aqueous compositions and preferably about 5% to about 95% (more preferably about 10% to about 90%) by weight of the combined weight of film-forming polymers.

In the aqueous composition according to the present invention, the combined weight of solids (which includes low and high molecular weight film-forming polymers, a surfactant, and optionally, other additives) preferably should comprise no more than about 85-90% of the total weight of the composition and the aqueous solvent should generally comprise no less than about 15% by weight of the composition, and preferably should be at least about 25% by weight of the composition. Generally, when the amount of solids is above about 85% by weight of the composition, the composition may become too viscous to have adequate transfer. An amount of solids below about 15% generally has too much solvent to be rapidly evaporated during the deposition process to create a tack-free surface. Solids include the low and high molecular weight film-forming polymers, wetting agent or surfactant, mar (scuff) resistant agent, hardening agent, coalescing agent, plasticizing agent, defoaming agent and pigment, among other components which are not otherwise considered solvents.

The effective amount of wetting agent or emulsifier and/or surfactant used in the present invention will generally range from about 0.01% to about 20% or more by weight of the aqueous coating composition. This amount is generally effective to provide sufficient wetting of the coating blanket or cylinder surface to obtain spreadability over the surface. to eliminate leveling problems which may be caused by surface tension during deposition onto the inked or uninked layer. The amount and type of emulsifer and/or surfactant used will generally depend upon the wetting characteristics of the solids without the wetting agent and/or surfactant. It is noted that the film-forming polymers and preferably, the low molecular weight film-forming polymer, also may be adapted to instill wetting characteristics to the coating composition. One of ordinary skill in the art will recognize to vary the amount and type of wetting agent and/or surfactant and the amount of type of film-forming polymer within the teachings of the present invention to provide adequate wettability and to eliminate surface tension in coating compositions according to the present invention.

In addition to the above components, the aqueous coating composition optionally comprises additional components which may improve mechanical transfer and/or film characteristics of the dried film, especially strength, gloss and durability, among others. Thus, aqueous coating compositions according to the present invention may employ any one or more of the following components: a mar (scuff) resistant agent, a hardening agent, a coalescing agent, a plasticizing agent, a release agent and a defoaming agent, among others. Preferably, a mar resistant agent and a release agent are included in the aqueous coating composition according to the present invention.

In the present invention any film-forming polymer typically used in coatings in the printing industry may be used. As used herein, the term “film-forming polymer” is used to describe those high and low molecular weight polymers or resins which can be formulated in aqueous coating compositions according to the present invention. These polymers can include thermoplastic resins, UV cured and related coating resins (both aqueous or non-aqueous based) which form a major component of the coating compositions used in the present invention. The term film-forming polymer can include oligomeric resins which have the ability to be UV or heat polymerized or cross-linked. In the case of UV or heat polymerized coatings, the film-forming polymer may be formulated alone or in combination with UV or heat polymerizable monomers.

It is noted that the term “film-forming polymer” embraces a large number of polymers and related resins used in the aqueous coating compositions according to the present invention and is not simply limited to the thermoplastic resins. Thus, film-forming polymers may include UV cured film-forming polymers as well as, in certain cases, thermoset resins, among others. Various mixtures of film-forming polymers may also be used.

The film-forming polymer may be any resinous or polymeric material including for example, poly(vinyl alcohol) and related copolymers, poly(methyl methacrylate) and related (meth)acrylate and acrylate copolymers, polystyrene and related copolymers, polyester copolymers, nylons, polyamides, polyethylene glycols, polyimides, polycarbonates, epoxies, polyacrylonitriles, polyethylene, polyvinyl, and polyvinylpyrrolidones, among others, including numerous copolymers of mixtures of monomers used in the above-described resinous materials. Preferably, the film-forming polymer is a relatively hydrophilic or water-dispersible resin or polymer.

Preferred film-forming polymers for use in the present invention include various water soluble or water dispersible copolymers of the following monomers: styrene, alpha-methylstyrene, ar-ethylstyrene, vinyltoluene, a,ar-dimethyl-styrene, ar-t-butylstyrene, o-chlorostyrene, m-chlorostyrene, p-bromostyrene, 2,4-dichlorostyrene, 2,5-dichlorostyrene, among other styrene-containing polymers, vinylnapthalene, alkylesters of (meth)acrylic acid such as n-hexyl (meth) acrylate, ethylbutyl (meth)acrylate, 2-ethyl-hexyl (meth) acrylate, n-octyl (meth)acrylate, ethyl (meth)acrylate, methyl (meth)acrylate, n-decyl (meth)acrylate, dodecyl (meth)acrylate and similar (meth)acrylic acid esters, alpha, beta-ethylenically unsaturated carboxylic acids, for example acrylic and methacrylic acid, fumaric acid, itaconic acid and mixtures of these acids, among others. Highly preferred film-forming polymers for use in the present invention include styrene-(meth)acrylate copolymers and derivatives thereof. Acidic monomers may be included in film-forming polymers to instill wettability characteristics to the polymer (by forming the free carboxylate which is water soluble).

In addition, numerous UV-cured or curable, film-forming polymers, oligomers or monomers may be used in the present invention, for example, versions of the above-mentioned (meth)acrylate and acrylate monomers, oligomers and polymers and copolymers, including urethane acrylates, epoxy acrylates, polyester acrylates, elastomeric (meth)acrylates, among others (available from Sartomer, Inc.), including mono, di, tri and tetra (or above) functional monomers or related oligomeric or polymeric compositions which optionally may be end-capped with monomeric units containing polymerizable double bonds, especially including vinyl or vinyl-type monomers, oligomers and polymers including those based on vinyl chloride, vinyl alcohol, vinyl acetate and related vinyl monomers, oligomers and polymers.

In the case of UV or heat curable film-forming monomers, oligomers and polymers, these compounds may be included in combination with photoinitiators or heat initiators in amounts which will aid polymerization of any polymerizable double bonds before or after deposition of the coating composition (generally, about 0.01% to about 12% by weight of the formulation, more preferably about 0.05% to about 5-6% by weight). The choice of initiator is to be made by one of ordinary skill in the art and preferably will be a UV activated or related initiator, including a heat activated initiator. Inasmuch as the UV cured film-forming polymer may require polymerization in a solvent which contains water, it is important that the initiator be stable (at least for periods sufficient to allow effective photopolymerization) in aqueous solvents. Photoinitiators may include, for example, alpha-hydroxyketone, benzophenone, benzophenone derivatives, trimethylbenzophenone, various acetophenone photoinitiators including Irgacure® and Darocur® photoinitiators (available from Ciba Specialty Chemicals), ethyl 4(dimethylamino) benzoate, benzyldimethyl ketal and isopropylthioxanthone, among others. Care must be given to the relative degree of hydrophilicity/hydrophobicity of the photoinitiator or heat initiators and the make up of the aqueous solvent (especially any cosolvents employed in combination with water). Preferably, the film-forming polymer is a relatively hydrophilic or water-dispersible resin or polymer.

While the above-described film-forming polymers are preferred for use in the present invention, it is clearly understood that one of ordinary skill in the art will be able to adapt other standard and non-standard film-forming polymers available in the art to the present methods without engaging in undue experimentation.

The film-forming polymers used in the present invention evidence good porosity to allow rapid evaporation of solvent, and depending upon application, may have particle sizes consistent with this porosity of about 1 nanometer to about 20 microns. In addition to the above characteristics, the film-forming polymers used in the present invention preferably evidence good flexibility within the range (both direct impact and reverse impact) of about 5" per 1 lb. to about 160" per 1 lb.

The low and high molecular weight film-forming polymers used in the present invention are most preferably acrylic or acrylic-styrene copolymers. In the general aqueous coating compositions used in the present invention, the high and/or low molecular weight film-forming polymers preferably comprise about 15% to about 85-90% by weight, and most preferably about 40% to about 85% by weight, the remainder being made up of other components as more fully described hereinbelow.

In addition to low and high molecular weight film-forming polymers, the aqueous coating compositions contain an effective amount of an emuslifier and/or surfactant to compatibilize or emulsify the film-forming polymers in the aqueous solvent. As used herein, the terms “wetting agent” “emulsifier” and “surfactant” describe compounds added to the film-forming polymers and solvent mixture to emulsify and compatibilize the film-forming polymer in the solvent, as well as providing the aqueous compositions with the quality of wettability. Wetting agents or emulsifiers for use in the aqueous compositions used in the present invention include, for example, OT 75 from American Cyanamid, FC 129 from 3M Co., Surfynol 104E by Air Products & Chemicals, Inc., among a huge number of others, including mixtures of these wetting agents. In general, the amount of wetting agent, emulsifier and/or surfactant included in the aqueous coatings of the present invention is at least about 0.05%, preferably at least about 0.1% to about 20%, more preferably about 0.5% to about 10% and most preferably about 1.0% to about 7.5% by weight of the composition, which amounts are generally sufficient for providing wettability of the aqueous coating onto the coating blanket or cylinder surface. In certain embodiments, it may be preferred to add an emulsifer in combination with a surfactant to promote wettability.

In addition to the low and high molecular weight film-forming polymers and emulsifier and/or surfactant, the aqueous compositions include an effective amount of a solvent, generally ranging from about 15% to about 80-85% by weight of the composition. Solvents used to formulate the aqueous coating compositions according to the present invention include, for example, water and optionally, at least one additional solvent for example, ethanol, methanol, acetone, methylethyl ketone, ethyl acetate, methyl acetate, isopropanol, n-butanol, n-butyl acetate, methylchloroform, methylene chloride, toluene, xylene, other aromatic (containing phenyl groups) solvents and mixtures thereof, among others, amyl acetate, numerous ethers, numerous other ketones and alkanes including pentane, cyclopentane, hexane, and cyclohexane, cyclic ethers such as tetrahydrofuran and 1,4-dioxane, among other solvents, including cellosolve, butyl cellosolve acetate, cellosolve acetate, methyl cellosolve acetate, butyl cellosolve and ethyl cellosolve. Aqueous systems which contain less than about 15% (more preferably less than about 5%) by weight VOC or which contain only water are clearly preferred.

In addition to at least one low molecular weight film-forming polymer and/or one high molecular weight film-forming polymer (preferably both), a solvent or mixture of solvents and a wetting agent or surfactant, the aqueous coating compositions according to the present invention also include at least one of the following: mar (scuff) resistant agents, hardening agents, coalescing agents, plasticizer agents and defoaming agents, among others, agents to reduce the coefficient of friction and provide adequate slip and/or slide angle (release agents). Pigments may also be added to the present compositions.

Exemplary mar resistant agents are added to the present invention in an amount effective to provide rub or mar resistance, and generally range from about 0.1% to about 10% by weight of the composition and include, for example, polyethylene and/or paraffin wax (available from S.C. Johnson & Son, Inc.) and Teflon SST-3 from Shamrock Chemicals, among others. Exemplary hardening agents are included in amounts generally ranging from about 0.05% to about 10-15% by weight and include, for example, zinc oxide (available in solution from S.C. Johnson & Son, Inc.), among others. Exemplary coalescing agents are included in amounts generally ranging from about 0.1% to about 10% by weight and include, for example butyl cellosolve from Union Carbide Corp. and propylene glycol from Olin Corp, among others. These agents serve to render flexibility to films in effective amounts. Exemplary plasticizing agents are generally included in amounts effective to produce adequate flexibility and adhesion to prevent chipping and cracking of the film, generally from about 0.1% to about 10% by weight of the composition. Plasticizing agents include, for example, Santicizer 160 and Santicizer 141 from Monsanto Corp., among numerous other plasticizing agents. Exemplary defoaming agents are included in amounts effective to substantially break up any foam which may occur during formulation or during the deposition process and generally about 0.1% to about 3% by weight of the aqueous composition. Defoaming agents include, for example, Foamkill 875 from Crucible Chemicals Corp. and Balab 3065A from Witco Corp., among others. Exemplary coefficient of friction agents are included in amounts effective to instill adequate slip or slide angle, i.e. generally about 0.1% to about 5% by weight. Exemplary coefficient of friction agents include LE 410 from Union Carbide Corp., among other agents.

The present compositions may also contain pigments. Pigments, either organic or inorganic (including pigmented dyes of sufficient hydrophilicity) may be used in amounts ranging from about 0.01% to about 30% or more by weight (preferably, less than about 15% within this range), preferably about 0.1% to about 5% by weight, depending upon the type of pigment, the type of application, e.g., gravure or flexographic and the color desired in the aqueous coating. The pigment is chosen for its ability to be compatible with the aqueous solvent and other components used in the compositions according to the present invention. Exemplary pigments include for example, AAOT yellow, Rex orange, (available from Hoechst), Moly Orange, Ba Lithol, Ca Lithol, Clarion Red, Cyan Blue, Valencia Orange, Titanium White, Bon Marroon and Titanium Dioxide (available from American Cyanamid), Med chrome, Phthalo blue (from Hercules), Bonanza red, Buckeye Red, Hamilton Red, Cyan Green, Cyan Blue (Sun Chemical), Carbon Black (Cities Services), Ranger 2B, Macatawa, Red Lake C, Diarylide Yellow, Saugatuck Red (Chemetron), Primrose (Imperial Chemical Co.), Reference Blue (S. Will), among numerous others. It is noted that in certain instances the inclusion of a hydrophilic organoclay rheological additive is included, especially in flexographic and gravure, including corrugated applications, etc.

All of the above-described agents are included in aqueous compositions according to the present invention in amounts effective to substantially instill the final coating with the characteristics sought in adding the component to the composition.

Preferred aqueous coating compositions according to the present invention include no more than about 15% by weight Volatile Organic Compounds (VOC's) and preferably contain an absence of VOC's.

In formulating the aqueous compositions according to the present invention, the film-forming polymers and surfactant are first formulated by mixing in an aqueous solvent. After sufficient mixing, the other additives may be added, also followed by mixing. Alternatively, one can add the film-forming polymers, surfactant and optional additives all at once to the aqueous solvent, followed by mixing. In certain instances, it may be advantageous to mix low or high molecular weight film-forming polymer separately with a solvent and optionally, surfactant, before adding the other film-forming polymer.

In accordance with the general method of the present invention, a representative apparatus, among others, as depicted in FIG. 1 is useful for carrying out the present invention. In certain instances in the figures, the same numeral may be used to depict the same element in different figures. In FIG. 1, the apparatus includes a coating pan 1 into which is placed the aqueous coating compostion to be deposited onto a substrate 13. In the apparatus in FIG. 1, coating pan roller 3 takes up aqueous coating composition obtained from coating pan 1 and deposits the coating composition onto a coating applicator roller 5 which meters out aqueous coating onto the surface of coating blanket 7. Coating blanket 7 is a low energy, non-stick reflective surface which surrounds coating cylinder 9 which exerts pressure on the substrate 13 in tandem with impression cylinder 10 as substrate 13 passes between coating cylinder 9 and impression cylinder 10 starting at nip 11. This results in a high gloss coating on substrate 13. Transfer cylinder 15 feeds paper substrate 13 onto impression cylinder 10 and exit transfer cylinder 16 removes the high gloss coated substrate from impression cylinder 10. Coating cylinder 9 and impression cylinder 10 may be used at ambient temperature or at elevated temperature.

Figure 2:
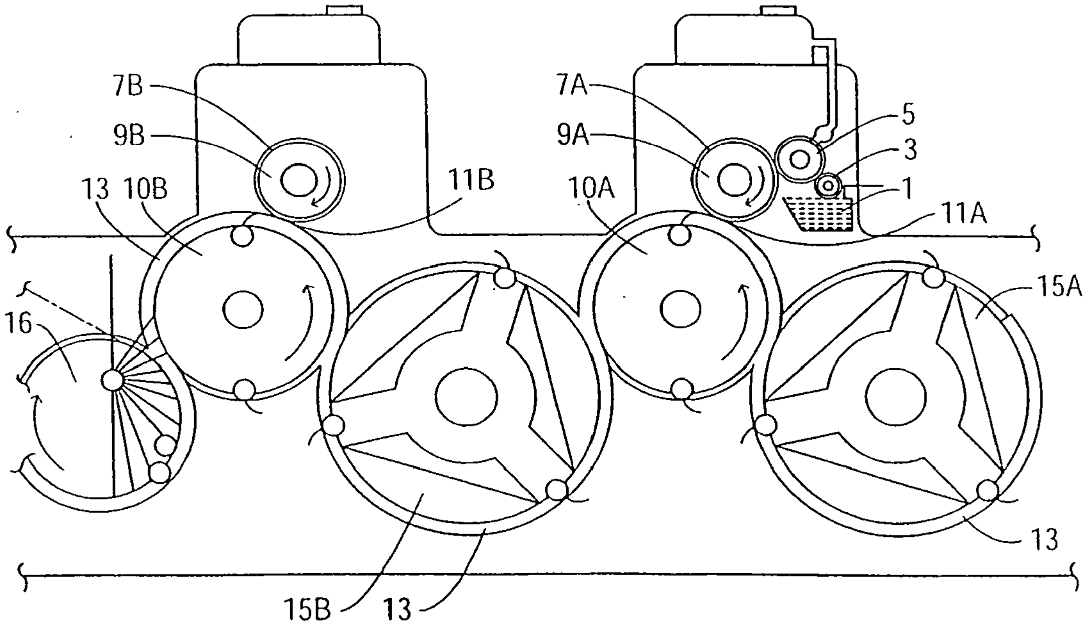
FIG. 2 provides a pictorial representation of an in-line coating unit having gap or nip areas for single coating applications wherein the cylinder coating face which provides a high gloss coat (a second coating cylinder) is located on a subsequent cylinder after coating is placed on the substrate using a first traditional cylinder coating face.

In a second embodiment which is depicted in FIG. 2, the method embodied is a single coating application with a coating face cylinder which provides for a high gloss coating found on a second coating cylinder. In FIG. 2, substrate 13 is fed to impression cylinder 10A by entry transfer cylijnder 15A. Aqueous composition contained in coating pan 1 is deposited onto coating pan roller 3 as in the embodiment in FIG. 1, which in turn, deposits the coating composition onto coating applicator roller 5 which in turn, coats coating blanket 7A with aqueous coating composition. Coating blanket 7A is a traditional coating blanket surface which surrounds coating cylinder 9A. Substrate 13 is fed between coating cylinder 9A and impression cylinder 10A at nip 11A. After substrate 13 is coated by coating blanket 7A, impression cylinder 10A feeds the coated substrate 13 to entry transfer cylinder 15B which feeds the coated substrate 13 onto impression cylinder 10B. As substrate 13 is fed between coating cylinder 9B, which contains a reflective, low energy, non-stick surface coating blanket 7B, and impression cylinder 10B, pressure and optionally temperature is applied to the coating on substrate 13 resulting in a high gloss coating, which is removed from impression cylinder 10B by exit transfer cylinder 16. Impression cylinder 10B, coating cylinder 9A and/or coating blanket 7 may be adapted to increase the temperature of the coating on substrate 13 as it passes between impression cylinder 10B and coating cylinder 9B. It should be noted that heat source 19 from FIG. 3 may be employed in this embodiment to provide heat onto the substrate during travel of the substrate from the impression cylinder 10A to impression cylinder 10B.

Figure 3:
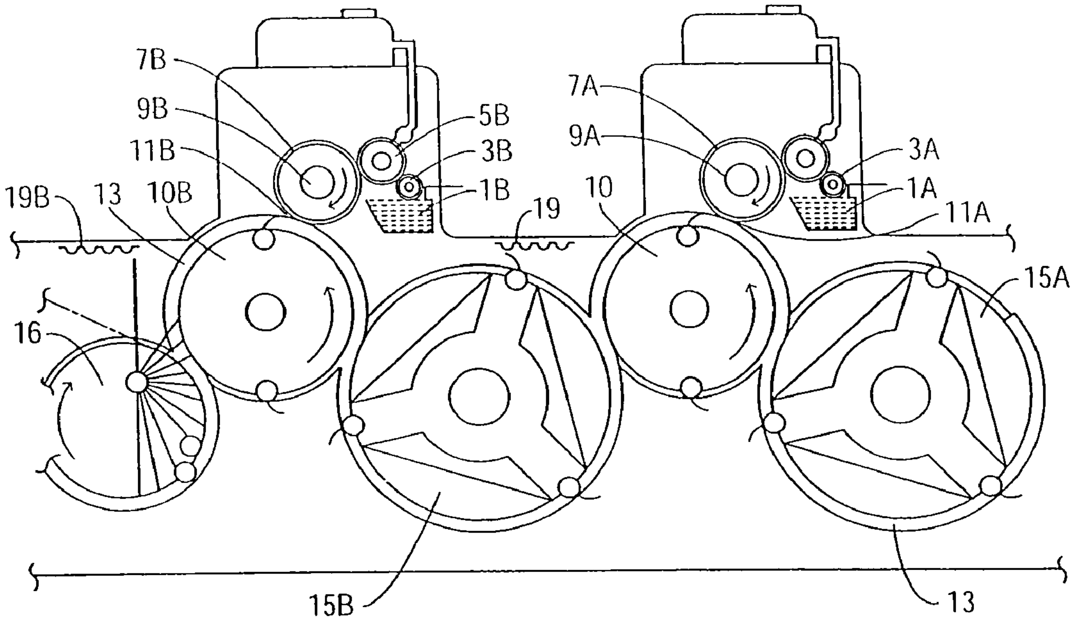
FIG. 3 provides a pictorial representation of an in-line coating unit having a gap or nip area for double coating applications wherein a non-stick, low energy, smooth coating face surface is located on the first cylinder and a traditional coating blanket surface is located on a subsequent cylinder with an optional infrared or heat source located between the first and subsequent cylinder in addition to an optional UV light source located after the first and subsequent cylinders.

In a third embodiment according to the present invention, a double coating application is depicted in FIG. 3. In this application, substrate 13 is feed to impression cylinder 10A by entry transfer cylinder 15A. Aqueous coating compoisiton contained in coating pan 1 is deposited onto pan roller 3 as in the embodiments in FIGS. 1 and 2, which in turn, deposits the coating compositon onto coating applicator roller 5, which in turn, coats coating blanket 7A with aqueous coating composition. Coating blanket 7A has a reflective low energy, non-stick surface which surrounds coating cylinder 9A. Substrate 13 is fed between coating cylinder 9A and impression cylinder 10A at nip 11A after substrate 13 is coated by coating blanket 7A. Impression cylinder 10A feeds the coating substrate 13 to transfer cylinder 15B, which feeds the coated substrate 13 onto impression cylinder 10B, optionally.

In this method a heat source (hot air or infra-red) 19 provides additional heat to coated substrate 13 as substrate 13 is fed between coating stations from impression cylinder 10A to coating cylinder 9B, which contains a traditional coating blanket surface 7B. Substrate 13 is fed between coating stations by transfer cylinder 15B. A second layer of non-aqueous UV coating, such as UV coating #707V100, manufactured by Rad-Cure, Fairfield N.J., is applied by coating blanket 7B, which obtains UV coating from coating pan 1B through coating pan roller 3B and coating applicator roller 5B.

It is noted that UV coating is transferred to substrate 13 at nip 11B. UV light is applied to coating on substrate 13 after it is fed to the delivery end of the press by exit transfer cylinder 16 resulting in a double coated high gloss coated image.

Figure 4:
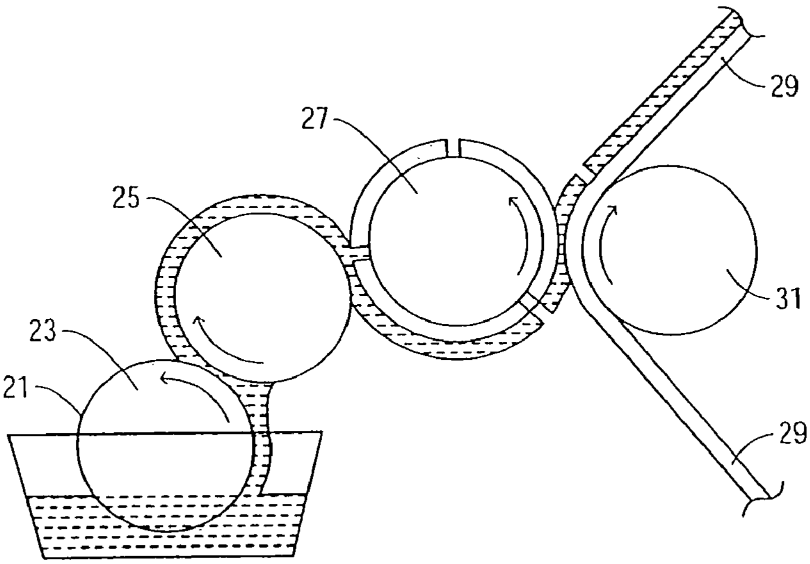
FIG. 4 provides a pictorial representation of a flexographic coating unit wherein aqueous coating is deposited onto the substrate by the coating face cylinder under pressure from the impression cylinder.

FIG. 4 depicts a flexographic printing system which can be used in the present method. Coating pan roller 23 applies coating composition onto anilox roll 25 from coating pan 21. The coating which has been applied to anilox roll 25 is subsequently applied to coating face cylinder 27. Flexographic is a gapless press cylinder, however, the coating face substrate mounts onto the cylinder by butting both ends of the substrate together. Substrate 29 passes between coating face cylinder 27 and impression cylinder 31 where coating is deposited from coating face cylinder 27 onto substrate 29 under pressure and optionally, heat or UV energy from coating cylinder 27 and/or impression cylinder 31.

Figure 5:
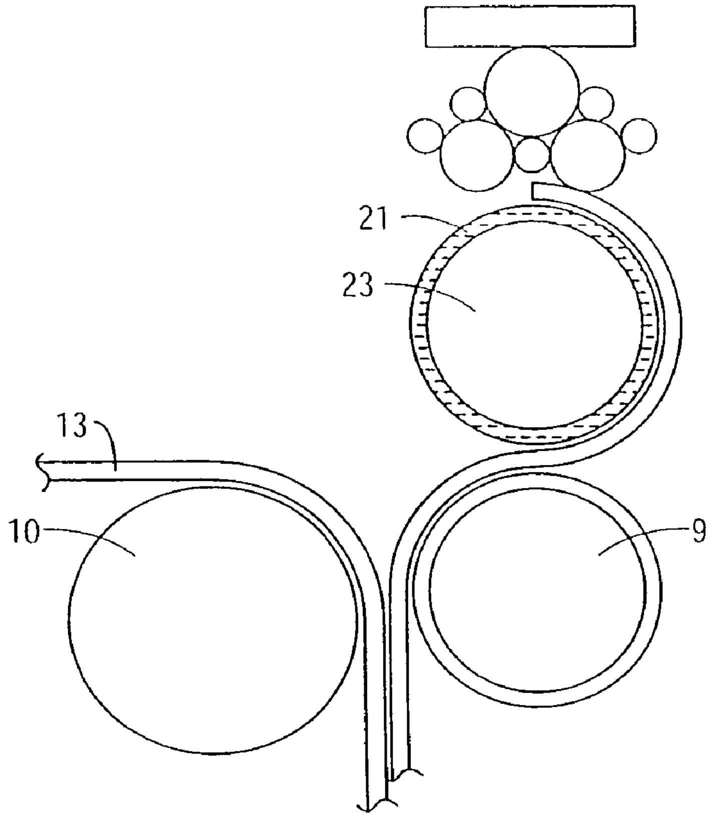
FIG. 5 provides a pictorial representation of a rubbery substrate, among others employed for transferring a coating composition onto a coating face cylinder.

FIG. 5 depicts the use of a rubbery substrate 21 (among others which may be used) on a plate cylinder 23 to apply composition onto a coating face cylinder 9 for deposition onto substrate 13 using pressure between coating face cylinder 9 and impression cylinder 10. One or more of the coating face cylinder or the impression cylinder may be designed as heated cylinders allowing for drying or semi-drying the applied wet coating film as the substrate is being squeezed between impression cylinder 10 and coating face cylinder 9.

Figure 6:
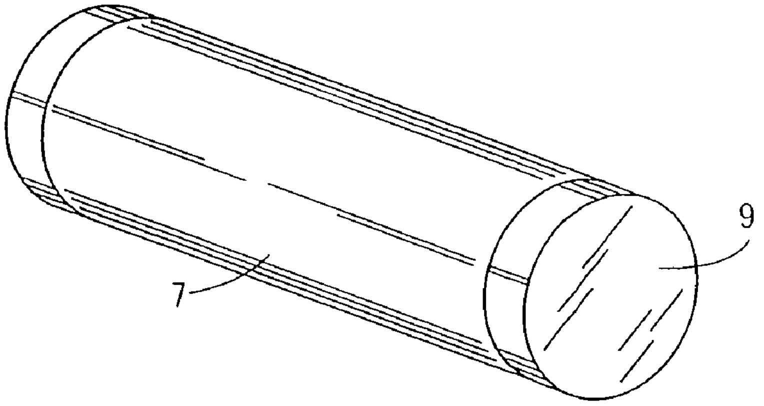
FIG. 6 provides a pictorial representation of a coating face blanket sleeve mounted on a gapless type press or coating cylinder.

FIG. 6 depicts a coating blanket 7 which has been mounted on a gapless coating cylinder 9 for use in a printing press, such as a Heidelberg M3000, among others.

While the above-described embodiments serve to describe the present invention, it is to be noted that one of ordinary skill will be able to readily modify traditional printing presses to produce high gloss coatings on flexible or inflexible substrates according to the present invention.

The following examples are provided to illustrate the present invention and should not be misunderstood or misinterpreted to limit the scope of the present invention in any way.

EXAMPLE 1

Preparation of an Aqueous Coating Composition for Use According to the Present Invention Aqueous Coating Composition #1

This experiment demonstrates the ability of an applied aqueous coating composition to effectively wet and level over the surface of a coating face substrate according to the present invention, a first step in assessing the feasibility of using that composition in a wet or dry trap coating and printing process.

| | |
|---|---|
| $H_2O$ | 18.0% |
| Low molecular weight polymer resin solution | 30.0% |
| High molecular weight polymer emulsion | 43.5% |
| Surfactant-Wetting agent | 3.0% |
| Defoamer | 0.5% |
| Polyethylene wax emulsion | 5.0% |
| | 100.0% |

Low Molecular Weight Polymer

Solid acrylic resin flake 98% non-volatile—Joncryl 684 manufactured by SC Johnson Polymer Note: The low molecular weight polymer is employed with other components for formulating a resin solution employed in the said coating composition.

| | |
|---|---|
| Joncryl 684 | 55.0% |
| Aqua Ammonia (28%) | 7.5% |
| Isopropyl Alcohol | 5.0% |
| Water | 32.5% |
| | 100.0% |

High Molecular Weight Polymer Emulsion

High molecular weight polymer emulsion is divided into two classes of emulsion.

| | |
|---|---|
| Joncryl 77 | 15.0% |
| Joncryl 89 | 28.0% |

Emulsions manufactured by SC Johnson, Racine, WI.
Surfactant - Wetting Agent
1. Flourochemical FC-129 from 3M, St. Paul, MN
2. Surfynol 104E from Air Products and Chemicals Inc.
3. A non-ionic organosilicone- Silwet copolymer L-7602 manufactured by OSI-WITCO, WVa.

The above surfactants-wetting agents were blended together to create the following formula which was employed in the said aqueous coating compositions.

| | |
|---|---|
| FC-129 | 50.0% |
| Surfynol 104E | 35.0% |
| Silwet L-7602 | 15.0% |
| | 100.0% |

Defoamer

Organic defoamer—Trico T-Zap 305, manufactured by Trico Technologies Inc, Mundelein, Ill.

Polyethylene Wax Emulsion

Jonwax 26, manufactured by SC Johnson Polymer, Racine, Wis.

Aqueous Coating Composition #2

High molecular weight polymer emulsion is divided into to classes of emulsions.

Joncryl 74F

Joncryl 89

Both Manufactured by SC Johnson Polymer, Racine, Wis.

| Polypropylene Wax Emulsion | |
|---|---|
| Water | 10.0% |
| Joncryl 74F | 55.0% |
| Joncryl 89 | 26.0% |
| Surfactant wetting agent | 3.5% |
| Polyethylene wax | 2.5% |
| Defoamer | 0.5% |
| | 100.0% |

| Aqueous Coating - Composition #3 | |
|---|---|
| $H_2O$ | 25% |
| Isopropyl Alcohol | 3% |
| Low molecular weight polymer resin solution | 50% |
| Plasticizing agent | 6% |
| Zinc oxide solution | 5% |
| Surfactant-wetting agent | 3% |
| Polyethylene wax emulsion | 3% |
| Polypropylene wax emulsion | 3% |
| Silicone emulsion | 2% |
| | 100% |

Note:
Zinc Oxide solution is manufactured by SC Johnson Polymer, Racine, WI
Plasticizing agent, Santicizer 141 manufactured by Ashland Chemicals.
Silicone emulsion, HV-490 manufactured by Dow Corning, Midland, MI The said aqueous coating compositions were applied wet trap inline to the coating face substrate of the present invention employing the ambient temperature method of the present invention. The test was conducted on a 40" Heidelberg Speedmaster CD press operating at a press speed of 5,000 to 15,000 sheets per hour. The test revealed that the surface tension value of the said aqueous coating composition was lower than the surface energy value of the coating face substrate of the present invention and thus produced a smooth uniform coating film over the wet inks and paper substrate.

Additionally, the test further revealed that the non-stick surface of the coating face substrate of the present invention eliminates the problem of production sheets sticking to the surface normally caused by residual coating film which remains behind during press trip ups. For example, production sheets stop going through the press units because of sheet feeding problems, which may often be due to residual coating being left on the any one or more of the cylinder surfaces. Furthermore, the test revealed that washing or cleaning of the surface was greatly reduced or eliminated because of the absence of residual coating and thus increased overall labor efficiency.

However, the above trip ups condition, when employing all well known surfaces for coating transfer, will normally leave behind a residual coating film which adheres to all said well known surfaces and causes the production sheets to stick.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

The invention claimed is:

1. A method of making a coated substrate comprising:

providing a blanket or coating cylinder having a non-stick coating face surface that has a reflective or mirrored finish;

applying a coating composition onto said coating face surface of said blanket or coating cylinder in said coating process; and bringing an inked or uninked substrate surface into contact with the coating composition on said coating face surface under conditions of temperature and pressure effective to directly transfer said coating composition from said coating face surface to said substrate surface to form thereon a tack-free coating film with a smooth high-gloss finish of at least about 50° reflection, so that said coating film adheres to said substrate surface and separates from said coating face surface.

2. The method according to claim 1 wherein said coating film is a moisture vapor transition (MVTR or barrier) coating.

3. The method according to claim 1 wherein said substrate has a surface energy of greater than about 31 dynes/$cm_2$.

4. The method according to claim 1 wherein said coating composition includes an agent to lower a surface energy value.

5. The method according to claim 1 wherein said coating composition is aqueous or non-aqueous and contains prepolymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent and mixtures thereof.

6. The method according to claim 1 wherein said coating is an aqueous coating composition comprising:

a) an amount of at least one film-forming coating polymer ranging from about 15% to about 90% by weight of said composition, said film-forming coating polymer comprising a high molecular weight film-forming polymer in an amount ranging from 0% to about 100% by weight of said film-forming coating polymer and a low molecular weight weight film-forming polymer in an amount ranging from 0% to about 100% by weight of said film-forming coating polymer with the proviso that the amount of high molecular weight film-forming polymer and low molecular weight film-forming polymer is at least 15% by weight of said film-forming coating polymer;

b) an amount of an emulsifier or surfactant ranging from about 0.05% to about 20% by weight of said composition; and c) an amount of water or a mixture of water and a solvent ranging from about 10% to about 85% by weight of said composition.

7. The method according to claim 5 wherein said pigment is included in said coating composition in an amount ranging from about 0.1% to about 30% by weight.

8. The method according to claim 1 wherein said coating composition comprises UV, heat or electron beam curable monomers, oligomers or polymers and optionally, an amount of an initiator effective to initiate polymerization of said curable monomers, oligomers or polymers, wherein said polymerization occurs in the presence of UV light, heat or electron beam energy effective to polymerize said coating composition simultaneously with or after transferring of said coating composition from said coating face surface to said substrate surface.

9. The method according to claim 4 wherein said coating composition comprises UV, heat or electron beam curable monomers, oligomers or polymers and optionally, an amount of an initiator effective to initiate polymerization of said curable monomers, oligomers or polymers, wherein said polymerization occurs in the presence of UV light, heat or electron beam energy effective to polymerize said coating composition simultaneously with or after transferring of said coating composition from said coating face surface to said substrate surface.

10. The method according to claim 8, further comprising operating a coating machine having at least one part that is UV light transparent, further comprising applying UV light to said coating composition during or after transferring of said coating composition from said coating face surface to said substrate surface.

11. The method according to claim 9, further comprising operating a coating machine having at least one part that is UV light transparent, further comprising applying UV light to said coating composition during or after transferring of said coating composition from said coating face surface to said substrate surface.

12. The method according to claim 8 wherein said coating composition comprises electron beam curable monomers, oligomers or polymers and an effective amount of an initiator.

13. The method according to claim 10 wherein said coating composition comprises electron beam curable monomers, oligomers or polymers and optionally, an effective amount of an initiator.

14. The method according to claim 11 wherein said coating composition comprises electron beam curable monomers, oligomers or polymers and optionally, an effective amount of an initiator.

15. The method according to claim 2 wherein said coating composition is aqueous or non-aqueous and contains pre-polymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent, and mixtures thereof.

16. The method according to claim 3 wherein said coating composition is aqueous or non-aqueous and contains pre-polymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent, and mixtures thereof.

17. The method according to claim 8 wherein said coating composition is aqueous or non-aqueous and contains pre-polymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent, and mixtures thereof.

18. The method according to claim 9 wherein said coating composition is aqueous or non-aqueous and contains pre-polymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent, and mixtures thereof.

19. The method according to claim 1 wherein said temperature is above ambient temperature.

20. A method of depositing a coating composition onto a surface in a coating method, said method comprising the steps of:

1). applying a coating composition onto a substrate using a first blanket surface or coating cylinder;

2). providing a second blanket or coating cylinder having a non-stick coating face surface that has a reflective or mirrored finish;

3). moving said substrate with said coating composition from said first blanket surface or coating cylinder to said second blanket surface or coating cylinder; and 4). bringing said substrate with said coating composition thereon into contact with said coating face surface for a predetermined time under conditions of temperature and pressure effective to form said coating composition into a coating film with a smooth high-gloss and substantially tack-free finish, said coating film adhering to said substrate surface, so that said coating film adheres to said substrate surface and separates from said coating film surface, said coating film with said finish on said substrate substantially conforming to said coating face surface of said second blanket or coating cylinder.

21. The method according to claim 20 wherein said coating film exhibits a high gloss of at least about 70° reflection.

22. The method according to claim 20 wherein said substrate has a surface energy of greater than about 31 dynes/$cm_2$.

23. The method according to claim 20 wherein said coating composition is aqueous or non-aqueous and contains pre-polymerized film-forming polymers, polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent and mixtures thereof.

24. The method according to claim 23 wherein said coating is an aqueous coating composition comprising:

a) an amount of at least one film-forming coating polymer ranging from about 15% to about 90% by weight of said composition, said film-forming coating polymer comprising a high molecular weight film-forming polymer in an amount ranging from 0% to about 100% by weight of said film-forming coating polymer and a low molecular weight weight film-forming polymer in an amount ranging from 0% to about 100% by weight of said film-forming coating polymer with the proviso that the amount of high molecular weight film-forming polymer and low molecular weight film-forming polymer is at least 15% by weight of said film-forming coating polymer;

b) an amount of an emulsifier or surfactant ranging from about 0.05% to about 20% by weight of said composition; and c) an amount of water or a mixture of water and a solvent ranging from about 10% to about 85% by weight of said composition.

25. The method according to claim 20 wherein said coating film is a moisture vapor transition (MVTR or barrier) coating.

26. The method according to claim 23 wherein said coating composition comprises UV, heat or electron beam curable monomers, oligomers or polymers and optionally, an amount of an initiator effective to initiate polymerization of said curable monomers, oligomers or polymers wherein said polymerization occurs in the presence of UV light, heat or electron beam energy effective to polymerize said coating composition simultaneously with or after transferring of the forming of said coating composition into said coating film.

27. The method according to claim 26, further comprising operating a coating machine having at least one part that is UV light transparent, also comprising applying UV light to said coating composition during or after transferring of said coating composition from said coating face surface to said substrate surface.

28. The method according to claim 25 wherein said coating composition comprises electron beam curable monomers, oligomers or polymers and an effective amount of an initiator.

29. The method according to claim 27 wherein said coating film is an MVTR barrier coating.

30. The method according to claim 20 wherein the forming of said coating film is effectuated solely by the application of pressure and heat during contact of said substrate and said coating composition with said coating face surface.

31. The method according to claim 24 wherein said coating film exhibits a high gloss finish of at least about 70° reflection.

32. The method according to claim 24 wherein said substrate has a surface energy of greater than about 31 dynes/$cm_2$.

33. The method according to claim 27 wherein said coating composition is aqueous or non-aqueous and contains polymerizable monomers, polymerizable oligomers or polymerizable polymers and optionally includes other additives selected from the group consisting of surfactants, emulsifiers, solvents, pigments, mar (scuff) resistant agents, hardening agent, coalescing agent, plasticizing agent, defoaming agent and mixtures thereof.

34. The method according to claim 27 wherein said coating composition is an aqueous coating composition comprising:

a) an amount of at least one film-forming coating polymer ranging from about 15% to about 90% by weight of said composition, said film-forming coating polymer comprising a high molecular weight film-forming polymer in an amount ranging from 0% to about 100% by weight of said film-forming coating polymer and a low molecular weight weight film-forming polymer in an amount ranging from 0% to about 100% by weight of said film-forming coating polymer with the proviso that the amount of high molecular weight film-forming polymer and low molecular weight film-forming polymer is at least 15% by weight of said film-forming coating polymer;

b) an amount of an emulsifier or surfactant ranging from about 0.05% to about 20% by weight of said composition; and c) an amount of water or a mixture of water and a solvent ranging from about 10% to about 85% by weight of said composition.

35. The method according to claim 34 wherein said coating film is an MVTR barrier coating.

36. A method of making a coated substrate comprising:

providing a blanket or coating cylinder having a non-stick coating face surface that has a reflective or mirrored finish;

applying a coating composition onto said coating face surface of said blanket or coating cylinder;

bringing an inked or uninked substrate surface into contact with the coating composition on said coating face surface;

during the contract of said substrate surface with said coating composition on said coating face surface, directly transferring said coating composition from said coating face surface to said substrate surface to form thereon a coating film with a smooth high-gloss and substantially tack-free finish on said substrate surface, said coating film adhering to said substrate surface and being separable from said coating face surface, the transferring of said coating composition and the forming of said coating film with said smooth high-gloss and substantially tack-free finish being effectuated solely by the reflective or mirrored finish of said coating face surface and conditions of temperature and pressure along said substrate surface and said coating face surface during the contact of said substrate surface with said coating composition on said coating face surface.

37. A method of depositing a coating composition onto a surface in a coating method, said method comprising the steps of:

1). applying a coating composition onto a substrate using a first blanket surface or coating cylinder;

2). providing a second blanket or coating cylinder having a non-stick coating face surface that has a reflective or mirrored finish;

3). moving said substrate with said coating composition from said first blanket surface or coating cylinder to said second blanket surface or coating cylinder; and 4). bringing said substrate with the coating composition thereon into contact with said coating face surface;

5). during the contract of said coating composition on said substrate with said coating face surface, forming said coating composition into a coating film with a smooth high-gloss and substantially tack-free finish on said substrate surface, said coating film adhering to said substrate surface and being separable from said coating face surface, the forming of said coating film with said smooth high-gloss and substantially tack-free finish being effectuated solely by the reflective or mirrored finish of said coating face surface and conditions of temperature and pressure along said substrate and said coating face surface during the contact of said coating composition on said substrate with said coating face surface.

38. A method of depositing a coating composition onto a surface in a coating method, said method comprising the steps of:

1). applying a first coating composition onto a substrate to provide a coated substrate;

2). moving said coated substrate to a nip between a low energy, smooth, non-stick coating face surface of a second blanket or coating cylinder and an impression cylinder; and 3). at said nip between said second blanket or coating cylinder and said impression cylinder, applying an effective amount of pressure and temperature and optionally UV, electron beam or infra-red energy, for a sufficient period of time to produce a substantially tack-free coating at said nip, said tack-free coating on said coated substrate substantially conforming to said coating face surface of said second blanket or coating cylinder, said coated substrate being in contact with said coating face surface only at said nip.

39. A method of depositing a coating composition onto a surface in a coating method, said method comprising the steps of:

1). applying a first coating composition onto a substrate to provide a coated substrate;

2). moving said coated substrate to a nip between a low energy, smooth, non-stick coating face surface and an impression cylinder; and 3). at said nip between said coating face surface and said impression cylinder, applying an effective amount of pressure and temperature and optionally UV, electron beam or infra-red energy, for a sufficient period of time to produce a substantially tack-free coating film at said nip, said tack-free coating film on said coated substrate substantially conforming to said coating face surface, said tack-free coating film being formed in contact with said coating face surface only at said nip.

40. The method according to claim 39 wherein said coating film is a moisture vapor transition (MVTR or barrier) coating.

41. The method according to claim 40 wherein said coating composition comprises UV, heat or electron beam curable monomers, oligomers or polymers and optionally, an amount of an initiator effective to initiate polymerization of said curable monomers, oligomers or polymers wherein said polymerization occurs in the presence of UV light, heat or electron beam energy effective to polymerize said coating composition simultaneously with or after said forming of said coating composition into said coating film.

42. The method according to claim 39, further comprising operating a coating machine having at least one part that is UV light transparent, also comprising applying UV light to said coating composition during or after said applying step 3).

43. The method according to claim 39 wherein said coating composition comprises electron beam curable monomers, oligomers or polymers and an effective amount of an initiator.

44. The method according to claim 41 wherein said coating film is an MVTR barrier coating.

45. The method according to claim 39 wherein the forming of said coating film is effectuated solely by the application of pressure and heat during contact of said substrate and said coating composition with said coating face surface.

46. The method according to claim 39 wherein said coating film exhibits a high gloss finish of at least about 70° reflection.

47. The method according to claim 39 wherein said substrate has a surface energy of greater than about 31 dynes/$cm_2$.

* * * * *